(12) United States Patent
Kilambi et al.

(10) Patent No.: US 8,116,564 B2
(45) Date of Patent: Feb. 14, 2012

(54) CROWD COUNTING AND MONITORING

(75) Inventors: Prahlad Kilambi, Santa Barbara, CA (US); Osama T. Masoud, Woodbury, MN (US); Nikolaos Papanikolopoulos, Minneapolis, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 1171 days.

(21) Appl. No.: 11/603,928

(22) Filed: Nov. 22, 2006

(65) Prior Publication Data
US 2008/0118106 A1 May 22, 2008

(51) Int. Cl.
*G06K 9/34* (2006.01)
(52) U.S. Cl. ........................................ 382/174; 382/103
(58) Field of Classification Search .................. None
See application file for complete search history.

(56) References Cited

U.S. PATENT DOCUMENTS

| | | | | |
|---|---|---|---|---|
| 4,827,264 | A * | 5/1989 | Bjelk | 342/61 |
| 5,475,802 | A * | 12/1995 | Wescott et al. | 345/441 |
| 2004/0017929 | A1* | 1/2004 | Bramblet et al. | 382/103 |
| 2007/0098253 | A1* | 5/2007 | Crespi et al. | 382/159 |
| 2008/0031514 | A1* | 2/2008 | Kakinami | 382/154 |
| 2008/0118106 | A1* | 5/2008 | Kilambi et al. | 382/103 |

FOREIGN PATENT DOCUMENTS
WO    WO2006057147    * 1/2006

OTHER PUBLICATIONS

Haritaoglu et al., "W4: Real-time surveillance of people and their activities", IEEE Transactions on Pattern Analysis and Machine Intelligence, vol. 22, No. 8, Aug. 2000, pp. 809-830.*
Shi et al., "Normalized Cuts and Image Segmentation", Computer Vision and Pattern Recognition, IEEE Computer Society Conference, 1997 IEEE Computer Society Conference on Computer Vision and Pattern Recognition (CVPR'97), 1997 on pp. 731-737.*
Otsuka and Mukawa, "Multiview Occlusion Analysis for Tracking Densely Populated Objects Based on 2-D Visual Angles," Computer Vision and Pattern Recognition, IEEE Computer Society Conference on, vol. 1, pp. 90-97, 2004 IEEE Computer Society Conference on Computer Vision and Pattern Recognition (CVPR'04)—vol. 1, 2004.*
Atev, S., et al., "Practical Mixtures of Gaussians with Brightness Monitoring", *Proceedings, IEEE International Conference on Intelligent Transportation Systems,* (2004), 423-428.
Davies, A. C., et al., "Crowd Monitoring Using Image Processing", *Electronics & Communication Engineering Journal,* (Feb. 1995), 37-47.

(Continued)

*Primary Examiner* — Bhavesh Mehta
*Assistant Examiner* — Tahmina Ansari
(74) *Attorney, Agent, or Firm* — Schwegman, Lundberg & Woessner P.A.

(57) ABSTRACT

This document discusses, among other things, methods and systems for determining the number of members in a group as well as changes over a period of time. Using an image of the scene, an overlap area is calculated by projecting portions of the image onto spaced apart and parallel planes. A filter correlates the overlap area to the number of members.

28 Claims, 10 Drawing Sheets

OTHER PUBLICATIONS

Haritaoglu, I., et al., "*Hydra*: Multiple People Detection and Tracking Using Silhouettes", *Proceedings, International Conference on Image Analysis and Processing* (ICIAP, 1999), (1999),280-285.

Haritaoglu, I., et al., $W^4$: A Real Time System for Detecting and Tracking People, *Proceedings, IEEE Conference on Computer Vision and Pattern Recognition*, (1998), p. 962.

Kilambi, P., et al., "Crowd Analysis at Mass Transit Sites", *IEEE International.Conference on Intelligent Transportation Systems (ITSC '06)*, (Sep. 2006), 753-758.

Marana, A. N., et al., "Automatic Estimation of Crowd Density Using Texture", *Safety Science*, 28(3), (1998), 165-175.

Masoud, O., et al., "A Novel Method for Tracking and Counting Pedestrians in Real-Time Using a Single Camera", *IEEE Transactions on Vehicular Technology.* 50(5), (2001), 1267-1278.

Masoud, O., et al., "Using Geometric Primitives to Calibrate Traffic Scenes", *Proceedings of 2004 IEEE/RSJ International Conference on Intelligent Robots and Systems,* (2004), 1878-1883.

Wren, C. R., et al., "Pfinder: Real-Time Tracking of the Human Body", *IEEE Transactions on Pattern Analysis and Machine Intelligence,* 19(7), (Jul. 1997), 780-785.

Zhao, T., et al., "Bayesian Human Segmentation in Crowded Situations", *Proceedings, 2003 IEEE Computer Society Conference on Computer Vision and Pattern Recognition (CVPR '03)*, (2003), 459-466.

Zhao, T., et al., "Tracking Multiple Humans in Complex Situations", *IEEE Transactions on Pattern Analysis and Machine Intelligence,* 26(9), (2004),1208-1221.

\* cited by examiner

CROWD COUNTING AND MONITORING

STATEMENT OF GOVERNMENT RIGHTS

The invention was made with Government support under agency grant number IIS-0219863 awarded by the National Science Foundation. The Government has certain rights in this invention.

TECHNICAL FIELD

This document pertains generally to image processing, and more particularly, but not by way of limitation, to crowd counting and monitoring.

BACKGROUND

In traffic control, accurate data as to pedestrian and crowd tracking can be used to improve safety and traffic flow. For example, a light-controlled intersection can be configured to operate automatically depending on the number of pedestrians waiting to cross a roadway.

Determining the number of members in a crowd is a difficult problem. Manual methods are exceedingly costly and are generally too slow. Previous attempts to use a processor have suffered from scalability and accuracy problems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1A:
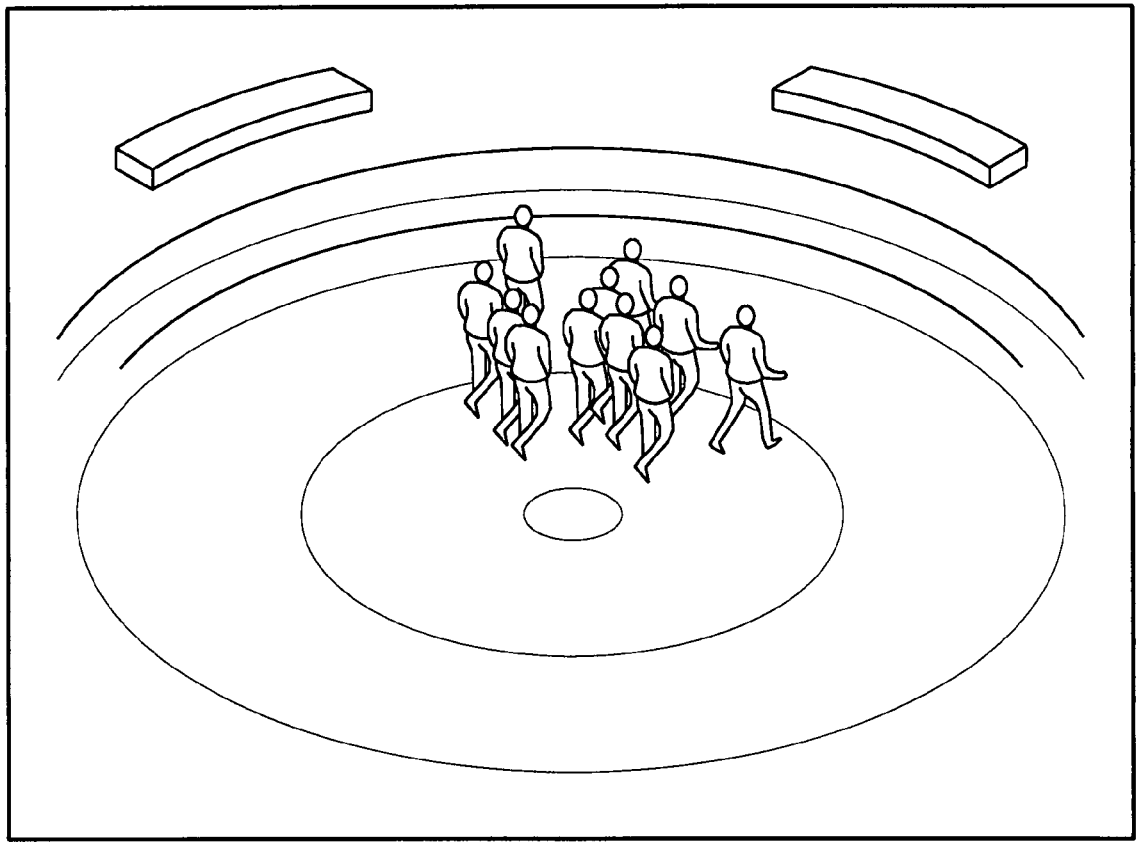
FIG. 1A illustrates a sample scene including a group of individuals moving together.

The following detailed description includes references to the accompanying drawings, which form a part of the detailed description. The drawings show, by way of illustration, specific embodiments in which the present subject matter may be practiced. These embodiments, which are also referred to herein as "examples," are described in enough detail to enable those skilled in the art to practice the present subject matter. The embodiments may be combined, other embodiments may be utilized, or structural, logical and electrical changes may be made without departing from the scope of the present subject matter. The following detailed description is, therefore, not to be taken in a limiting sense, and the scope of the present subject matter is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

An example of the present system can be configured to monitor a crowded urban environment and to monitor groups of people in real-time. The number of people in a scene can be counted and tracked. Using prior knowledge obtained from the scene and camera calibration data, the system learns the parameters for estimation. This information can be used to estimate the count of people in the scene in real-time. There are no constraints on camera placement. Groups of people, animals or other dynamic entities can be tracked in the same manner as individuals.

Methods

The present subject matter can be embodied as instructions stored in a computer readable medium for execution by a processor. The instructions can be configured to execute a method as described herein.

An example of the present subject matter includes a method to estimate the number of people in a scene or an environment. The crowd can include an individual or a dense group of people moving together. Each individual or group is separately tracked as an entity using, for example, an extended Kalman filter based tracker.

The present subject matter operates on an image having a foreground region that has been segmented through a background estimation technique. The segmented foreground region can be generated in real-time using various methods, including for example, mixtures of Gaussians.

Using the segmented foreground region of the image, the present system identifies regions corresponding to humans based on known characteristics as to human shape and motion.

There are two modes of tracking people. The first mode tracks individuals and uses a filter. In one example, the filter is a Kalman filter. Other types of filters are also contemplated, including for example linear or non-linear filters such as Particle filters, Wiener filters and other types of filters. The second mode, which extends the filter tracker to count the number of people in a group, is activated when a blob (in the motion-segmented image) is identified to be large enough to correspond to more than one human. A blob is a generally contiguous region in an image. The blob is identified based on prior knowledge about the projected area of a human on the ground plane in the scene. In this manner, the area becomes independent of the location of the blob in the scene.

Figure 1B:
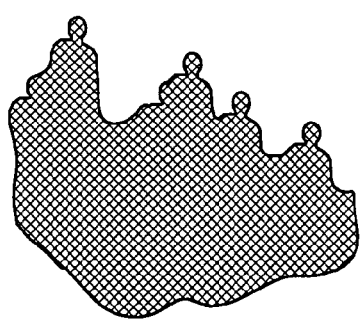
FIG. 1B illustrates a motion-segmented blob corresponding to the group of people illustrated in FIG. 1A.

FIGS. 1A and 1B illustrate a sample scene including a group of individuals moving together. In FIG. 1A, the members appear to be traveling in a direction toward the upper right corner. In FIG. 1B, the background and foreground has been removed and the members are depicted as a blob in which it is difficult to discern individual members.

An underlying assumption provides that humans, in general, move together with a fixed gap between adjacent members. This gap is averaged to a single value over a group.

The system is initially trained using domain-knowledge about the scene. Training can be heuristic-based or shape-based. The results of the training can then be used to estimate the count of people in the scene based on area measurements derived through camera calibration data.

The present system is robust to motion, orientation, and distribution of the group. The effect of occluded members is mitigated, in one example, by treating the crowd as a whole group for each frame in an image sequence and by maintaining a history of estimates for each blob throughout the lifetime of the blob so that the most occurred value (modal estimate) is chosen at any given frame. This is a reasonable estimate as groups which move together do not generally split or merge too often. When two different groups merge, the number of people in the scene does not change, so rather than estimating the number of members in the new group, each group is tracked individually based on their history of estimates. Multiple groups are likely to merge only temporarily and thereafter split into multiple groups again, as, for example, might happen when two groups moving in opposite directions cross each other.

I. Tracking

Tracking can reduce the number of false alarms including, for example, miscounts based on other moving objects in the scene. Tracking can also reduce errors caused by occlusion due to static and dynamic objects in the scene.

In the case of a single person, tracking is performed using an Extended Kalman filter as per a pedestrian tracker which uses a Kalman filter to treat erratic data as an aberration and smooths the trajectories out. The pedestrian tracker uses a window of previous measurements in order to decide about the weight that it assigns to each new measurement and then proceeds to supplying an estimation about the future expected measurements.

In the case of groups as well, a similar Kalman filter tracker is initialized and used to track the location and velocity of the group. The assumptions and parameters used in the case of the single person tracker are valid for tracking groups as well.

The Kalman filter tracker alone does not provide information about the number of people in the group. It may be insufficient to estimate the count independently frame-wise since such a method is not robust to unusual situations which may occur temporarily.

For each group, one example of the present subject matter maintains a history of estimates throughout the lifetime of the group. The history of estimates for the blob also enables the system to generate an estimated count for groups which merge and split over time.

Since the shape of the blob does not represent a single group, the assumptions about the shape of the group do not hold true. Thus, the Kalman filter tracker is extended in the following ways for tracking groups:

1. All blobs whose area (area of polygon which is the intersection of the projected blob onto ground and head planes) exceeds an area threshold are classified either as a group or as a large object (i.e., a bus or a car). According to one example, the area threshold is selected as some value less than the area corresponding to two individuals in the real world.

2. For blobs larger than the area threshold, the extended Kalman filter (EKF) tracker is initialized by observing the velocity of blobs for a small number of frames. If the velocity of a blob remains above a particular velocity threshold, then it is assumed that the blob corresponds to a vehicle and the system does not estimate a count for that region. The remaining large blobs are classified as groups and the counting algorithm is applied and a group tracker is initialized.

3. For all blobs whose area is less than the area threshold, a comparison is made as to height and width. A blob is treated as an individual person if the blob height is greater than the width. For each such blob, the present subject matter initializes an EKF tracker and tracks the blob for a minimum number of frames. If the blob can be reliably tracked for a minimum number of frames, then the blob corresponds to an individual. All other blobs correspond to noise and are thus discarded.

In one example, it is assumed that individuals are taller than wider and so all blobs whose width is greater than the height either correspond to a group or noise. For these blobs, if they can be reliably tracked using a Kalman filter for a minimum number of frames, then determine if the blob is a group, otherwise the blob is discarded as noise.

A. History of Estimates

A group tracker is initialized when a group is detected for the first time. The group tracker includes a single person Kalman filter tracker with the following extensions to estimate the number of people in the group. It is initialized as follows:

1. An estimate for the count C of the group is added to a list for Counts for this group along with a score of 1 for the count C.

2. A list which represents the age (in number of frames) since this count C occurred is appended with the value 0 (i.e., this count occurred 0 frames ago). After initializing a tracker, the lists are updated based on the estimate for the current frame.

B. Real-time Per Frame Count

Counts for groups of people are estimated on a per frame basis through a counting algorithm, some examples of which are described below.

For a real-time count on a per frame basis, the system selects a single number from the series of estimates throughout the lifetime of a blob. A number of statistics can be used as the estimator for the count. In various examples, the mode, median, or average are selected. The mode and median are less sensitive to outliers. The mode reflects the estimate with the most occurrences and hence confidence of the estimation algorithm. In such an example, the count of people for each group is the modal estimate based on the history of estimates (i.e., the count with the maximum score in the group's lists).

II. Counting Method Based on Area

The number of people in the scene can be determined, in part, using the area occupied (on the ground) in the real world. The area is computed in the real-world using data from a calibrated camera.

Projection and Measurement of Area

Measurements of the area are conducted in world coordinates or scene coordinates. The segmented image is transformed into world coordinates through projection using the camera calibration information. The camera is calibrated to allow extraction of three dimensional (3D) information from a two dimensional (2D) image taken by that camera. The camera may be virtual or real.

The camera is calibrated as to intrinsic parameters (including attributes of the camera that affect the image such as the image center or principle point, focal length, aspect ratio or skew, scaling factor, and lens distortion—pin-cushion effect) and extrinsic parameters (the camera position in the real world including the placement and orientation of the camera, a rotation matrix and a translation vector).

Figure 2A:
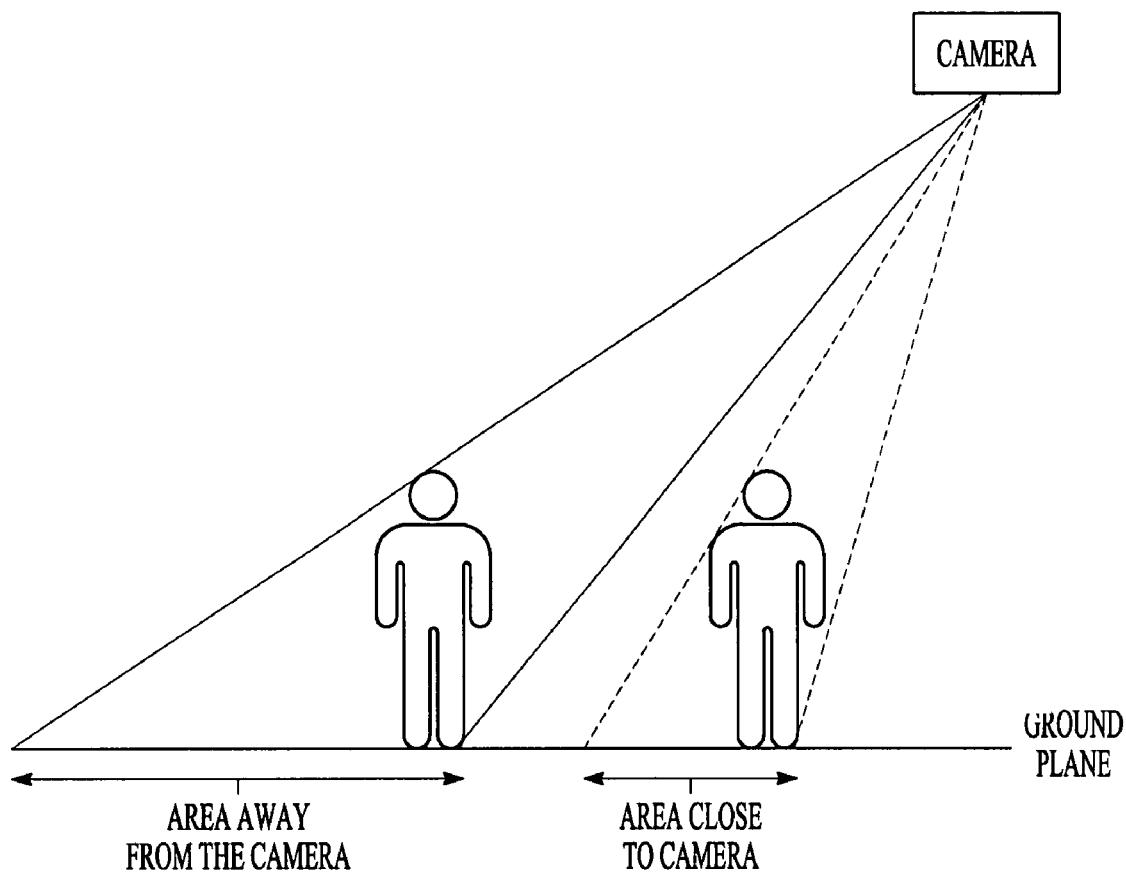
FIGS. 2A and 2B illustrate geometry used in calculating projected areas for individuals.
Figure 2B:
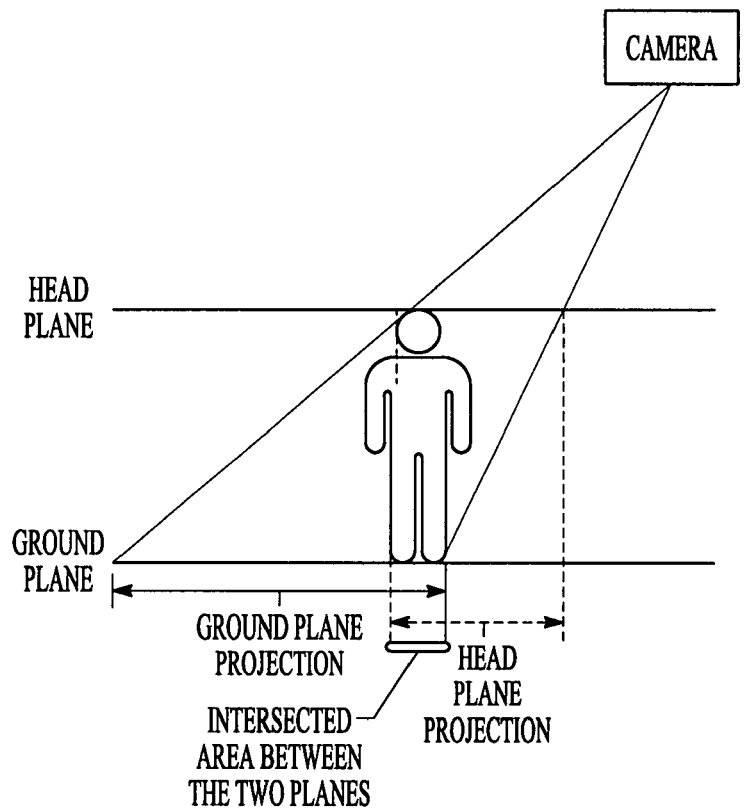

It is assumed that people are moving on the ground plane in the real world. In this context, this amounts to projecting the blobs (corresponding to people) onto the ground plane as shown in FIGS. 2A and 2B. As noted in FIG. 2, if the projected area alone were to be used, objects located further away from the camera will project to larger areas.

FIG. 2B illustrates the ground plane, the head plane and the intersected area between the two planes. As shown in the figure, projections of the blob are made onto both the ground plane and the head plane. In one example, the intersected area is calculated in terms of world coordinates. This eliminates the variation of area with the distance from the camera as illustrated in FIG. 2A. This method also removes from consideration any object that yields an intersected area of zero for having failed to project on both planes, such as shorter objects including pets and bicycles.

This method reduces false detections from other objects commonly found in urban environments and reduces errors caused by shadows on the ground plane. As used hereafter, the term area refers to the intersected area in the world coordinates.

One example of the present subject matter includes a training phase which involves a representative sample of individuals. The sample of individuals are counted and the area in the scene occupied by the sample is measured to compute parameters to estimate the count for groups.

Methods for measuring the count can include a heuristic approach or a shape-based approach, each of which includes a training phase.

III. Heuristic-based

The heuristic method assumes that all humans have the same average height (for example, 160 cm) in general and that the humans move in groups which maintain the same distance between individuals throughout.

A. Heuristic-based Training

The head plane is assumed to be constant and equal to the average human height (160 cm). The average area (intersected area) occupied by each individual moving in the scene is computed. The mean area is calculated to obtain the average area occupied by a single human, K. This then becomes the heuristic based on which groups are counted.

When moving in groups, individuals ordinarily maintain a buffer zone to prevent touching. The gap between each person, typically about one foot, is included in the heuristic K.

B. Heuristic-based Counting

The counting procedure is applied to groups of individuals. Initially, the present subject matter determines if the object being tracked represents an individual or a group using a tracking method.

1. For each foreground region, determine if the area exceeds 2K. If not, then initialize a single person tracker for this region and assume that it corresponds to one person.

2. If the area exceeds 2K, then switch to group tracking mode (described in the tracking section) and assume that the tracked object represents a group. As such, the count for the group in the current frame is estimated to be Count=Area/K.

3. Update the estimate of the group tracker if the blob is already being tracked, otherwise initialize a group tracker with this Count as the initial estimate of the count for the group.

4. Sum all Counts, including all individuals and groups in the frame, to find the number of people in the scene. This can be done in real-time on a frame-by-frame basis.

C. Bounds on Count based on Training Statistics

Since the choice of the value K affects the counting procedure, statistical training can be used to provide confidence intervals for the count.

The area of a reasonably large sample (for example, 20) of individuals is computed uniformly spread out in space and time in the scene. This reduces biases due to location in the scene or possible changes in segmentation due to lighting changes. The mean, $\mu_K$ and standard deviation $\sigma_K$ are computed from these samples. In one example, the mean value is the average area of a human used to estimate the count. Confidence intervals for the estimates are computed as follows:

Given the area of the group, the mean count would be given as C=Area/$\mu_K$. The 95% confidence intervals for the count, for example, is within (Area/$\mu_K$−2$\sigma_K$, Area/$\mu_K$+2$\sigma_K$).

IV. Shape-based

The heuristic-based method may not be suitable for all situations. For example, the heuristic-based method assumes a high spatial density which may not be suitable for sparse groups. Significant gaps between individuals may overestimate the count since the actual number of people occupying the same area may be less. The heuristic-based method also assumes that the head plane is a constant. The accuracy may be affected if the groups include very tall or very short members. The heuristic-based method may not handle changes in the configuration or the dynamics of the group explicitly. In particular, if the configuration of a group changes, then the area may change even though the number of people has not changed.

A probabilistic approach may be used to provide an estimate for counts of a group based on shape probabilities.

A. Group Geometry

The shape-based method makes certain assumptions about group geometries. In general, groups of crowds form cylinders having an elliptical base in the real world. Hence, it is more likely for a group to move in a cylinder rather than as a single queue. This could happen though in cases of marching bands for example. Thus, the possibility of no shape is ruled out. Also, the shape of the group is unlikely to change unless there is a split in the group. Although people may move within the group and reorient themselves, the overall shape of the group is not affected much. Therefore, the shape-based method generates a shape that best fits a particular group of people.

B. Shape Model

The shape that best approximates a group of people in the real world is an elliptical cylinder. Mathematically, an elliptical cylinder S is specified as S($\theta$, h) where $\theta$={x and y coordinates of the center, radii of major and minor axis, the angle of orientation with respect to the x-axis} completely specifies the ellipse, and h is the height of the elliptical cylinder corresponding to the human height.

C. Shape Priors

Figure 3:
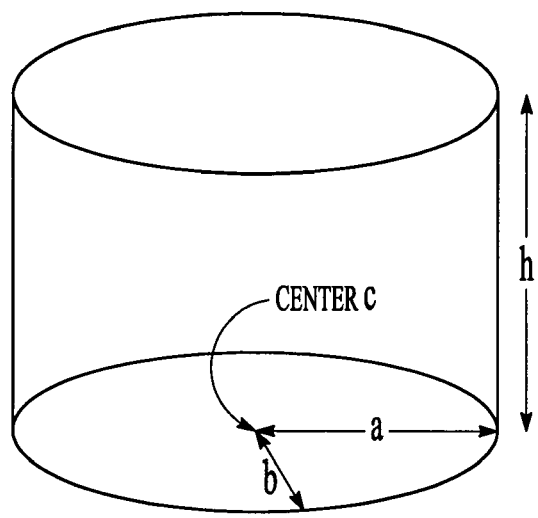
FIG. 3 illustrates an elliptical cylinder used to model an individual or group.

With prior information about a scene, and the way in which people move within the scene, certain prior probabilities can be calculated. For example, a narrow pavement in the scene will tend to constrain groups of individuals into long narrow shapes. Such prior information can then be incorporated into the shape model. Nevertheless, groups tend to move in a circular configuration and hence, shapes which closely resemble cylinders are given higher probability and shapes further away from this are penalized. Hence the prior for the shape S is p(S)=p(r)p(h) where p(r) and p(h) are the prior probabilities of the ratio between the major and minor axes of the ellipse, r=a/b, and h, is the height of the elliptical cylinder which corresponds to the human height respectively. FIG. 3 illustrates an elliptical cylinder with axes labeled according to the notations used herein.

These priors are modeled as follows. The distribution of the ratio of the axes controls the shape of the ellipse. The subject matter assumes that a large group of people is most likely to move as a circular group rather than as a straight line. This is the configuration that maximizes interaction between all the people and can be modeled as a Gaussian $N(\mu_r, \sigma_r^2)$, where $\mu_r=1$ and $\sigma_r^2=0.2$.

The distribution of the height corresponds to the height of the elliptical cylinder and hence the average height of the group. The most likely height is assumed to be that of the average human height h=160 cm. Values which are far away from this value are less likely and so the height is also modeled as a Gaussian $N(\mu_h, \sigma_h^2)$, where $\sigma_h$=160 cm and $\sigma_h^2$=20.

These models, and values, can be changed according to the nature of the scene and, in one example, can be specified by user input.

In the absence of prior information or without making assumptions about the shape of groups, and without loss of generality, all shapes can be weighted with equal priors and these priors will then be used to find the optimal shape approximation for the group.

The priors may be stored along with the estimated count based on the chosen shape for a given frame. A real-time estimate can then be calculated as an average of all the previous estimates throughout the lifetime of this group weighted by these priors.

D. Finding an Optimal Shape

Based on the model for shapes, an example of the subject matter then determines which of the shapes best approximates the blob at hand. In one example, this includes identifying an elliptical cylinder which best fits the blob in image space.

Assume the elliptical cylinder is specified completely by $S(\theta,h)$. A cost function is used to measure the difference between the projection of this shape $S(\theta,h)$ in image space, W(S) and the blob B. In one example, the cost function is defined as $$C(B, S) = 1 - \left( \frac{\text{Overlap Area}(B, W(S))}{\text{maxArea}(B, W(S))} p(S) \right) \quad (1)$$

where, W(S) is the world-to-image transform applied to the shape S, and p(S) is the shape prior, (i.e., the probability of the shape S). The problem can be framed as minimizing this cost function C as follows.

The function C is a non-linear function of blob B and the shape S. Since B is given, this amounts to finding the values of the parameters $\theta$ and h that minimize C. There is no closed form solution to this problem. Hence, this is solved using an iterative non-linear minimizer such as the Conjugate Gradient Method or Large-scale Bound-constrained or Unconstrained (LBFGS), which searches for a solution based on an initial estimate and the gradients of the cost function. If the initial solution is good (that is, close to the minima), the iteration converges quickly to the optimal value. The gradients for the cost function are computed using central differences.

1. Initial Solution to the Iteration

A reasonable guess for the initial solution, to facilitate rapid convergence of the iteration, is generated as follows:
 1. Project the blob onto the ground plane as polygon P1.
 2. Project the blob onto the head plane (160 cm above the ground plane) to polygon P2.
 3. Find the intersecting polygon between P1 and P2, as this is the region corresponding to humans, i.e., P3=P1∩P2. All these polygons are in world coordinates.

An elliptical cylinder that approximates this polygon can be specified as follows:
 1. Find the first two eigenvectors of the contour of the polygon P3. Let these be $\vec{v_1}$ and $\vec{v_2}$. The major and minor axes of the ellipse are along these vectors respectively. Also the ratio r=a/b is in the ratio of the first two eigenvalues namely, $\lambda_1/\lambda_2$.
 2. The center of the ellipse (x, y) is computed from the moments of the contour of the polygon P3.
 3. The height of the cylinder is 160 cm since that was the height used to obtain the projected polygon P3.

This routine provides an initial solution for the approximation to the polygon P3 and is used to obtain the shape $\hat{S}$, with parameters $\hat{\theta}$ and $\hat{h}$ which provides an optimal approximation by minimizing the cost function C.

Figure 4:
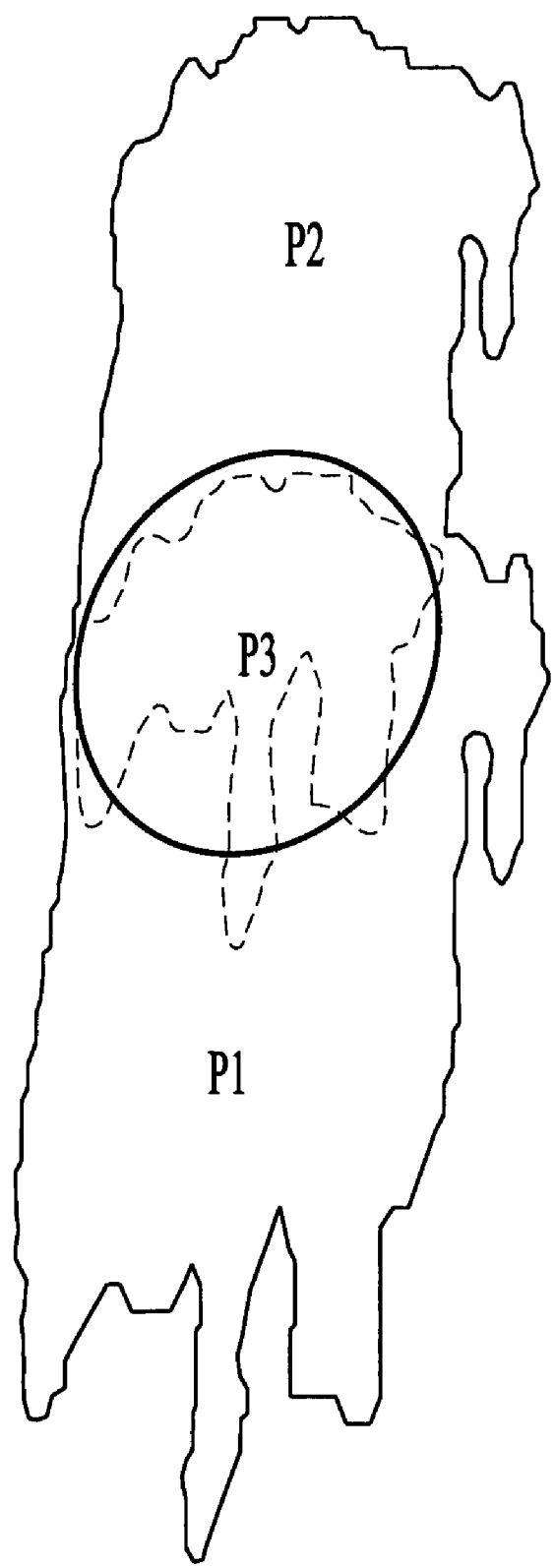
FIG. 4 illustrates projected polygons corresponding to a blob.

These polygons are shown in FIG. 4. The projection onto the ground plane is depicted as polygon P1 located towards the lower portion of the figure with numerous peaks corresponding to heads. The blob projected on the head plane forms a smoother region denoted as polygon P2 shown in the upper portion of the figure. The dotted polygon represents the intersected polygon P3. The smooth ellipse in the middle denotes a calculated approximation of that shape. This ellipse, when projected back to the image through the reverse transforms, produces an elliptical cylinder that best fits the blob of the group. The area of this world ellipse is used to estimate the count of the group.

Figure 5A:
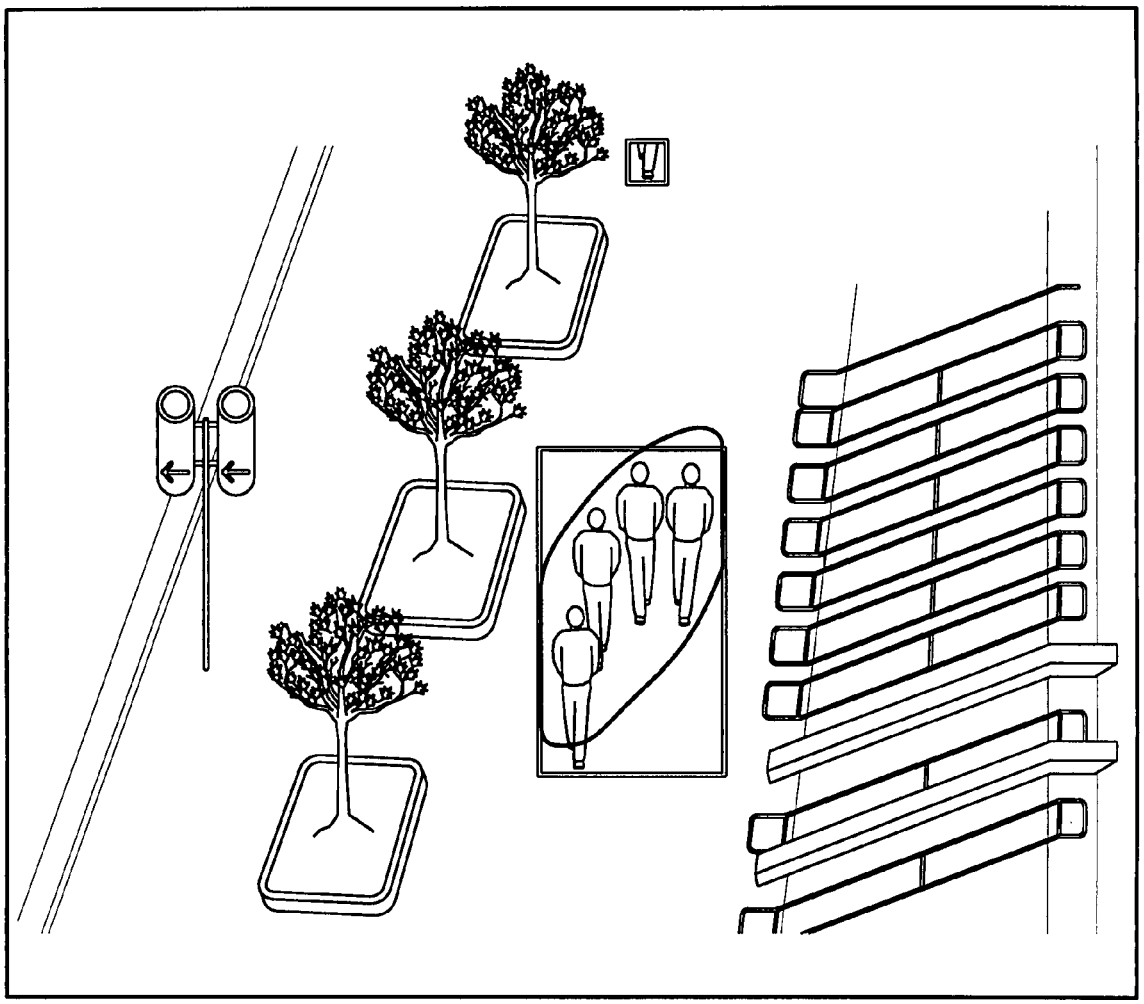
FIG. 5A illustrates a sample scene with a group of individuals.
Figure 5B:
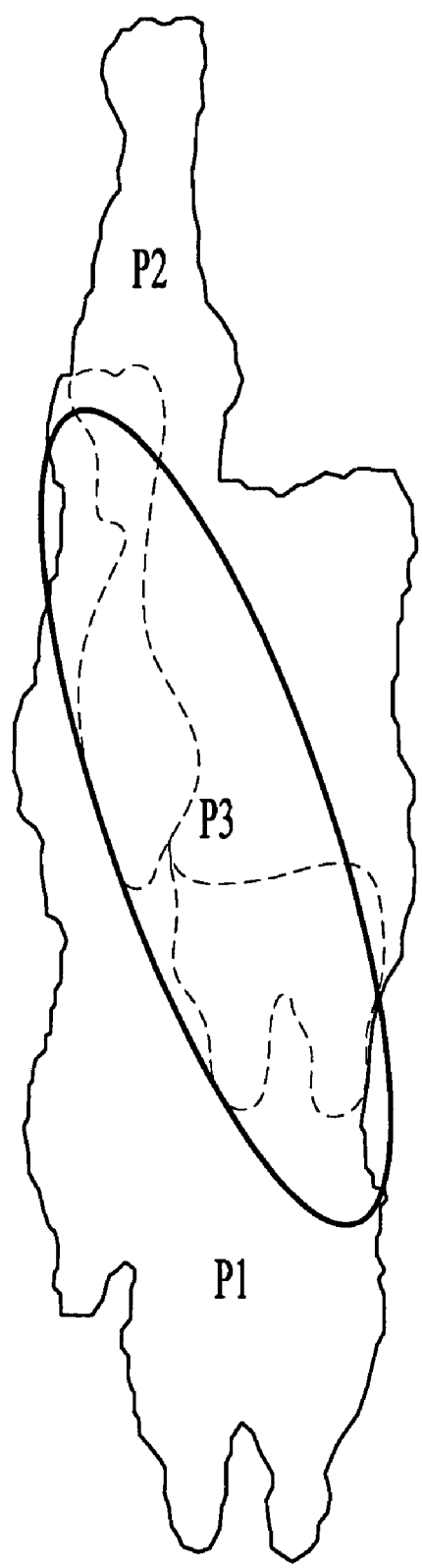
FIG. 5B illustrates a single ellipse fitted to disjoint polygons.

The projected polygon may not be a single polygon. This can happen if the groups have unusual gaps and orientations. For example, consider the following case illustrated in FIGS. 5A and 5B. Here, the group of four people are moving in separate pairs which then appears as two disjoint polygons. The person at the front of the group is slightly detached from the rest of the group so in the projected world space, it shows up as two disjoint polygons, even though they are part of the same blob in the image. If a single ellipse is selected to approximate this configuration, the result may be a poor fit, as shown in FIG. 5B.

Figure 5C:
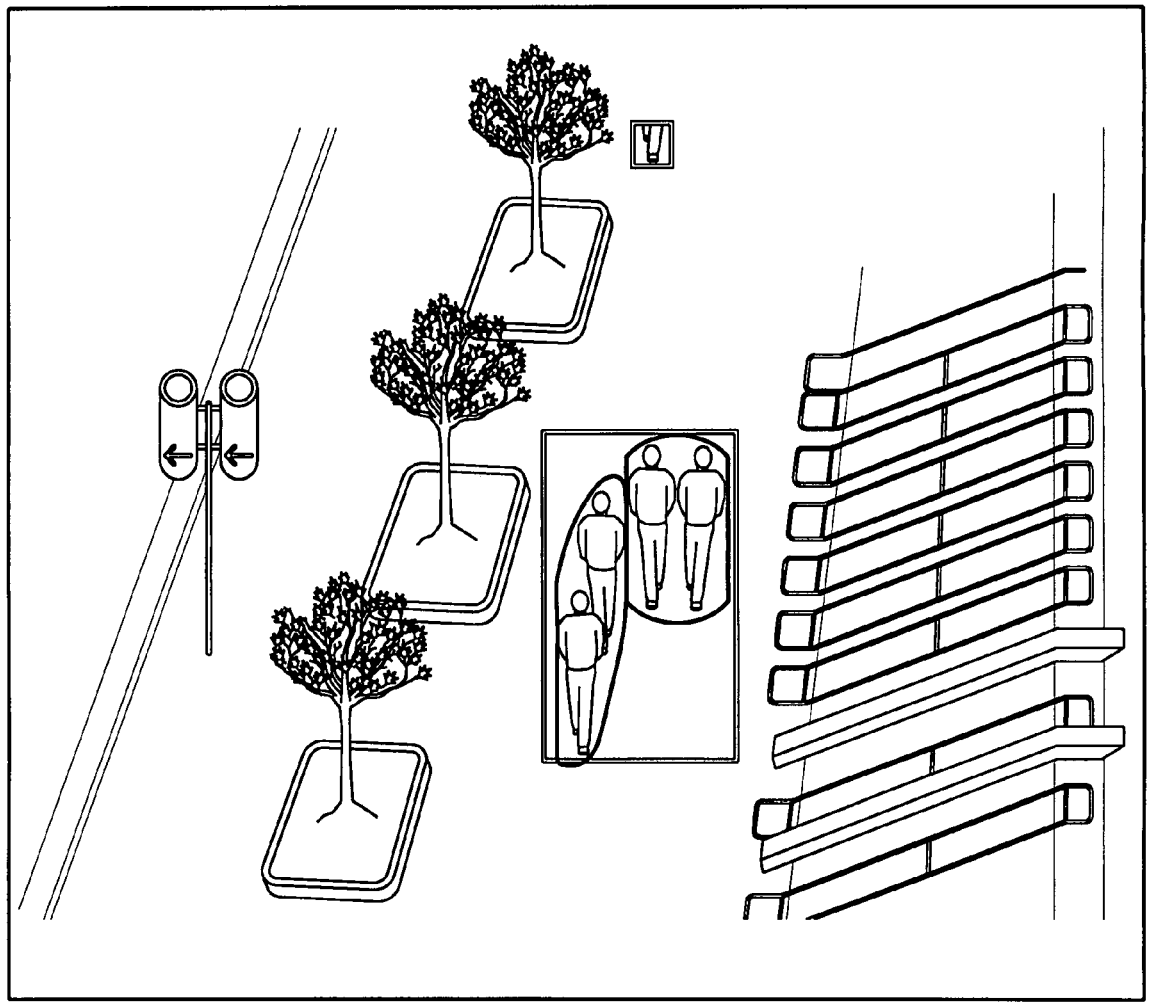
FIG. 5C illustrates two ellipses fitted to the scene of FIG. 5A.
Figure 5D:
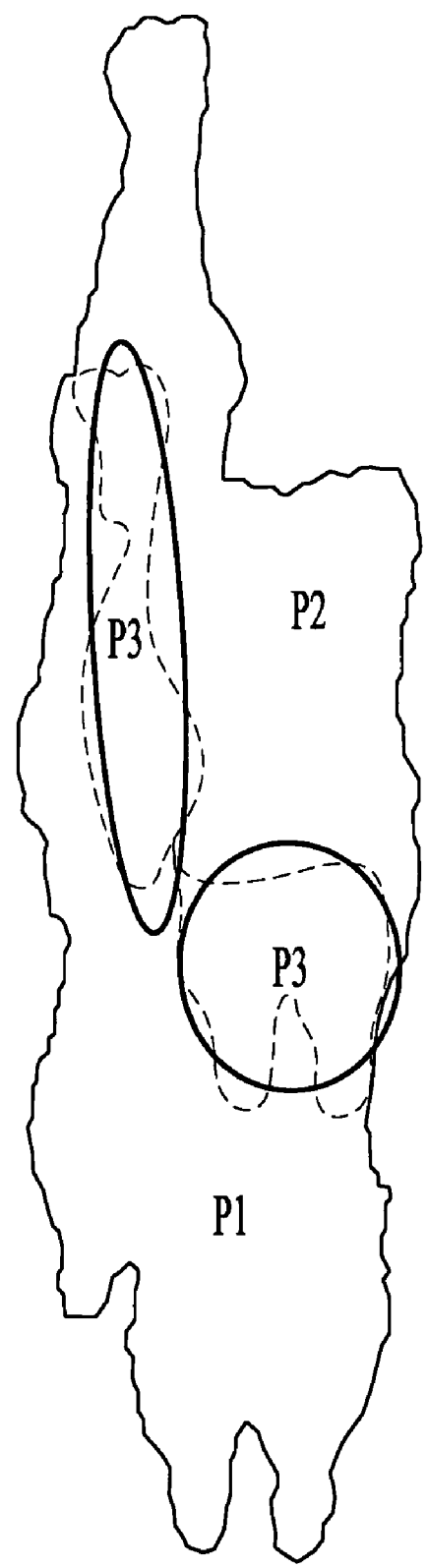
FIG. 5D illustrates two ellipses fitted to the scene of FIG. 5A.

In such a case, two or more ellipses are used to approximate the two shapes in the world coordinates. The same procedure described above for fitting a single ellipse can be applied to each of the disjoint polygons. In this case, the cost function to be minimized becomes $$C(B, S) = 1 - \left( \sum_i \frac{\text{Overlap Area}(B, W(S_i))}{\text{maxArea}(B, W(S_i))} p(S_i) \right) \quad (2)$$

where, $S_i$ is the set of ellipses. This calculation yields a solution having two disjoint ellipses as shown in FIG. 5D which corresponds to the separate pairs noted in FIG. 5C. The two ellipses, when projected back to the image, produce a more accurate fit as shown in FIG. 5C.

To minimize the cost function, one solution picks the minimum of the costs from Equations (1) and (2).

2. Computing the Cost Function

The following is a procedure that is executed multiple times in every iteration of the non-linear optimization.

Given the initial approximation $S_i$, compute the cost function C.

1. Transform the ellipses on the ground plane and head plane as follows.
   a. compute the Ground to Image and Head to Image Homography as, (using MATLAB notation)

$HGI = A*W2C(1:3, [1,2,4])$ $HIG = HGI^{-1}$.

b. transform the ellipse in world coordinates (represented by its conic matrix $C_g$) to the image as follows $C_i = HIG^T * C_g * HIG$.

This will yield two conics in the image plane, one each from the ground and head planes of the scene.

2. Compute the convex hull of these polygons to be P4.
3. Calculate the cost as $$C = \left(1 - \frac{Area(P4 \cap B)}{\max Area(P4, B)}\right) * p(S_i)$$

where B is the polygon representing the blob.

E. Training for a Spatial Density of the Group

Based on a reasonably sized sample of individuals in the video sequence, find the average area of the intersected polygons for their projected blobs onto the head and ground planes in the world. In most cases, this shape is a circle. Hence, the radius can be computed from the area.

An average spatial density (gap between individuals moving in a group) is assumed to be one foot. In one example, spatial density is selected to be a different value based on prior knowledge about the scene. In one example, the spatial density is increased by half a foot, and its area $A_h$ recomputed. Thus, the cylinders which approximate the people touch each other. This amounts to packing as many circles (humans) as possible in the ellipse corresponding to the group.

F. Counting

The foregoing method determines the optimal shape $\hat{S} \in S$ which minimizes the cost function C. Let the area of the ellipse that forms $\hat{S}$ be A. In the multiple ellipse case, this is the sum of the areas of each ellipse. Also assume that each human corresponds to a cylinder whose base occupies a constant area $A_h$, as computed during training. As such, the actual count is given by Count=$A/A_h$.

For each region or blob, this count is computed using the optimal shape approximation and also added to the group tracker's history of estimates for this blob.

V. Other Considerations

Given a motion-segmented image of a group of people (such as is shown in FIG. 1), certain assumptions (for example, the spatial density or the distance between individuals in the group) are made in order to estimate the size of the group.

One example of the present subject matter generates an estimate of the count of a group based on the size of the blob. A lower and upper bound for the count of a group can be determined based on spatial density.

A. Spatial Density and Bounds-based Counting

To compute an upper bound, assume a tight packing or high spatial density. Given a particular blob, calculate the maximum number of people that can occupy that area. In such case, the gap between individuals is minimized. In one example, this calculation is made using the techniques described elsewhere in this document.

To compute a lower bound, determine the minimum number of people that can occupy a given blob. This calculation corresponds to a configuration of people which produces the maximum non-overlapping area in the world of the projected blob. This can be computed by back-projecting a single circular shape (corresponding to one person) centered at the ellipse in the world onto the image and using this area as the area for one person in that blob. The minimum count is then the ratio between the blob area and the area corresponding to one person.

B. Alternate History of Estimates

In one example, two separate lists of estimates (corresponding to the upper and lower bounds on a per frame basis) are maintained. This yields a series of estimates for the maximum and minimum throughout the lifetime of the group. In one example, the estimates are stored in a memory accessible to a processor.

According to one example, the most likely estimate can be obtained from the minimal upper bound (the 10% estimate from the series of maximum estimates) up to the current frame, since this corresponds to individuals bunching up in the group and moving with a spatial density corresponding to the value assumed. This technique, referred to as alpha trimming, may be more robust to outliers than picking the minimum. It may also provide a more reasonable and realistic estimate than the modal and average estimators described elsewhere in this document.

C. Occlusion Handling

Occlusion handling may be viewed in terms of the merging and splitting of groups with other groups as well as moving objects. Merging and splitting of groups is common.

1. Group Merging

The following routine addresses dynamic occlusions. When two groups (or a group and an individual) merge, the shape models, as well as the motion models assumed to estimate the count, may not be valid. Rather than treating the combined object as one object, they are tracked as two separate objects corresponding to the original objects using only the predicted values of the Kalman filter. For a merge involving a group, the history of estimates for the group is maintained without updating it. Thus, the modal estimate before the merge is used as the count for the group. The count for the merged group then becomes the sum of counts of all groups and individuals that were part of the merger. During this time, only the age since the last update list is incremented. When this exceeds a threshold (for example, 30 frames), then the estimate is deleted or removed from the list. If all estimates have been deleted and the merged group still has not split, that is interpreted to mean that the merged group is now moving as one group and a new estimate of the count is calculated and the tracker is initialized again.

A merge typically occurs when people (or groups) cross paths. The merged condition is typically temporary and while merged, a shape-based estimate may not be valid due to the different directions of motion of the people involved.

2. Group Split

When a split occurs, the number of people in the scene does not change. Thus, one example of the present subject matter maintains the pre-split estimate of the group for a limited time after the split has occurred. In one example, the pre-split estimate is maintained for a period of 30 frames. This approach deals with static occlusions which are part of the background, such as a signpost or a utility pole. If the group remains split after this time period, then the split pieces are treated as separate entities (individuals or groups as the case might be). As such, the present subject matter then resumes estimating the count for each split entity.

VI. Experimental Results

Demonstrations of the present subject matter can be conducted on three different scenes using 8 different camera positions. The camera height is varied from 27 feet to 90 feet. Heights lower than approximately 15 feet are complicated by members in the foreground obscuring background members. The tilt of the camera can be varied from 20 to 40 degrees. An example of the present subject matter can be demonstrated using groups of people varying in size from 2 to 11.

Some video can be used where the scenes include crowds of 40 people at a given time. Methods described herein can be used on such video sequences with good results. A Pentium IV 3.0 GHz personal computer can be used for real-time data processing. The scenes can be calibrated using Masoud's camera calibration technique which uses landmarks of known dimensions in the scene to extract the intrinsic and extrinsic camera parameters.

A. Note on Computational Cost

The running time for different methods can be considered. In Table I, for example, the frame rate for different methods over some crowded scenes are shown. The values denote frames per second.

TABLE I

| Groups (No. of people) | Heuristic based | Shaped-based w/o optim. | Shape-based w/ optim. |
|---|---|---|---|
| 1 (10) | 30 | 30 | 25 |
| 2 (15) | 30 | 27 | 20 |
| 5 (33) | 25 | 21 | 11 |

Equal priors were used for all shapes for computing the cost function for the data shown. In some cases, the optimization for the cost function minimization (Equation (1)) converges within 5 iterations. The results given here were generated using the LBFGS technique. The bulk of the computation is spent in each iteration of the optimization routine. As can be seen in Table I, the frame rate drops with an increase in number of groups. However, the frame rate is independent of the sizes of these groups. So it matters little if there are two groups of 3 people each or 20 people each. The run-time remains approximately the same. The heuristic-based method, on the other hand, always runs in real-time (30 fps) regardless of the number of groups in the scene.

B. Accuracy of Modal Estimate

For both sequences, estimates of group counts are written to a file based on the per frame count over the entire lifetime of the group. The total number of people in the scene is displayed at the top left corner on a per frame basis as shown, for example, in FIG. 4.

Table II shows the average count for the method based on the modal estimate of all the per frame counts over the lifetime of the blob from 3 different video sequences. In some cases, the shape-based method outperforms the heuristic approach for larger groups. In cases where groups of 2 or 3 people are miscounted, the images show that the people are not really moving together but appear together in a single blob. The ellipse fitting method may be vulnerable to this error as reflected in the tables. Overestimates are noted when the groups are far from the camera or near the horizon. As the distance from the camera increases, the per pixel error increases, (i.e., the distance between two neighboring pixels is greater). This type of error can be reduced by establishing a region-of-interest in which data beyond the region is not considered in the calculation.

TABLE II

| Group Size (No. of people) | No of groups | Heuristic count | Shape-based count |
|---|---|---|---|
| 2 | 46 | 2.46 | 2.60 |
| 3 | 29 | 2.80 | 3.82 |
| 4 | 18 | 4.45 | 4.23 |
| 5 | 19 | 5.34 | 5.36 |
| 6 | 11 | 6.55 | 6.49 |
| 7 | 6 | 8.20 | 7.81 |
| 8 | 4 | 9.04 | 8.85 |
| 9 | 5 | 9.7 | 9.48 |
| 10 | 4 | 8.90 | 10.43 |
| 11 | 3 | 12.5 | 11.63 |

In one example, the distance between the group and the camera is incorporated into the priors while tracking. Estimates further away from a camera are weighted so that they have a lesser influence on the count than the estimates made closer to the camera.

C. Per Frame Error of Estimate

From the per-frame count given by each method for each group, the error in each frame can be computed based on the ground truth. The averages of all these errors over the lifetime for larger groups in four different sequences are shown in Table III (shown in normalized per frame errors).

TABLE III

| Group Size (No. of people) | No. of frames | Heuristic Error per frame | Shape Error per frame |
|---|---|---|---|
| 8 | 332 | 1.44 | 1.17 |
| 9 | 530 | 1.51 | 1.30 |
| 8 | 372 | 1.04 | 0.85 |
| 11 | 354 | 1.81 | 0.72 |
| 9 | 383 | 0.70 | 0.83 |
| 10 | 156 | 1.53 | 1.24 |
| 10 | 224 | 1.86 | 1.03 |

From the data shown, neither method has a normalized per frame error of more than two.

D. Differentiating Groups and Individuals

In one example, the threshold on the area to differentiate between individuals and groups for the sequences was selected to be slightly below twice the area occupied by one individual in that sequence. In one example, the present subject matter allows the user to select a threshold.

E. Counting Based on Bounds

Figure 6:
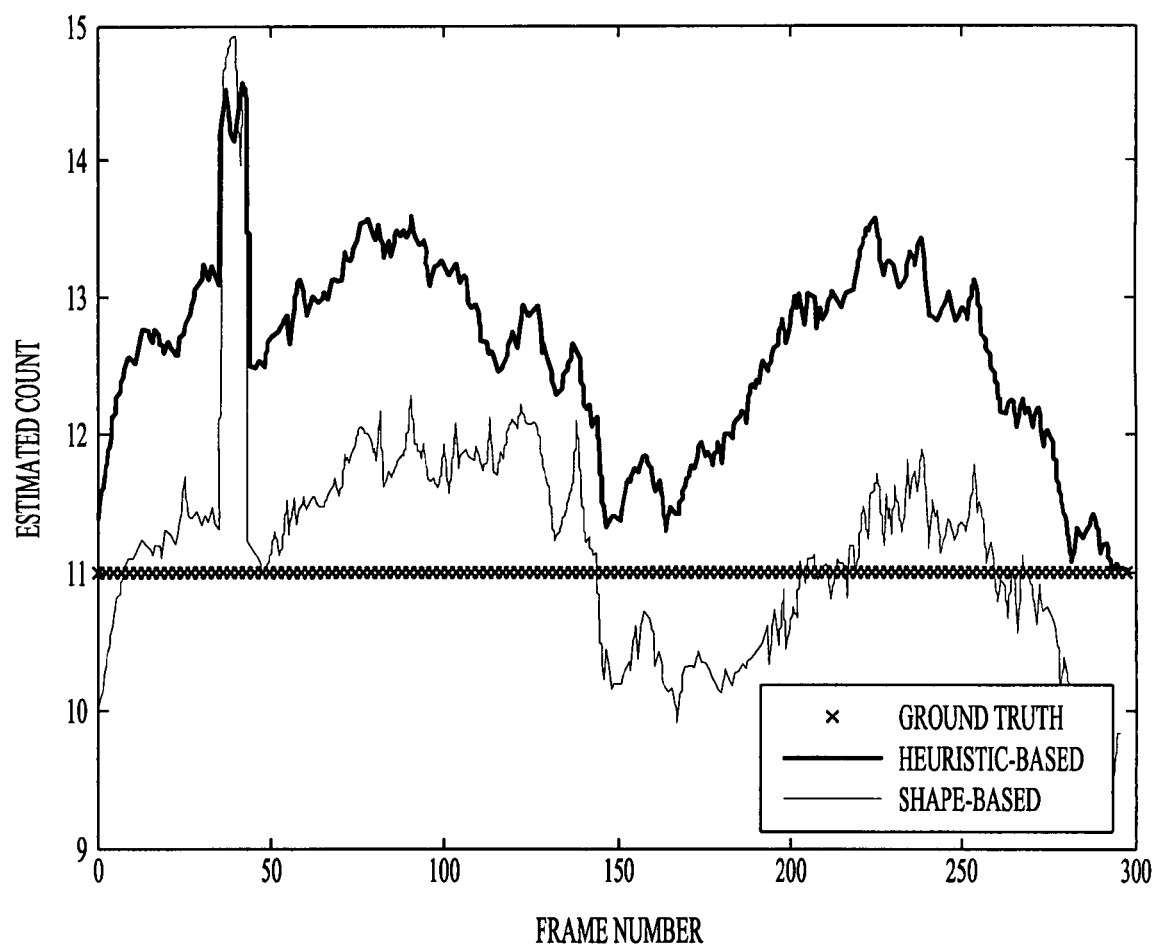
FIG. 6 illustrates a plot of counts over a lifetime of a group of people.

The graph in FIG. 6 shows the counts produced using the bounds based counting method over the lifetime (284 frames) of a group of 11 people. As can be seen, the results are more reliable and less prone to regions of inaccurate estimates. This estimate is also more stable. The minimum lower bound is very close to the ground truth for a short period, which corresponds to when the group has bunched up together and represents a spatial density close to the assumed value. The spike before frame 50 appears as before from the modal estimate. This was because the group actually spread out while making a sharp turn in the scene. But the bounds-based count is not affected by this spike as it picks the 10% estimate from the series of maximal estimates.

If a group moves through a scene with a large gap, or if two groups move at a distance such that they appear as one big blob, then one example of the present subject matter may overestimate the count. For example, consider two groups, of sizes 6 and 4 respectively, moving as though they were one group with a gap in between. This gap may not be seen in the motion segmented blob image. The shape-based method (which fits a single elliptical cylinder to the blob) may overestimate.

Structure

Figure 7:
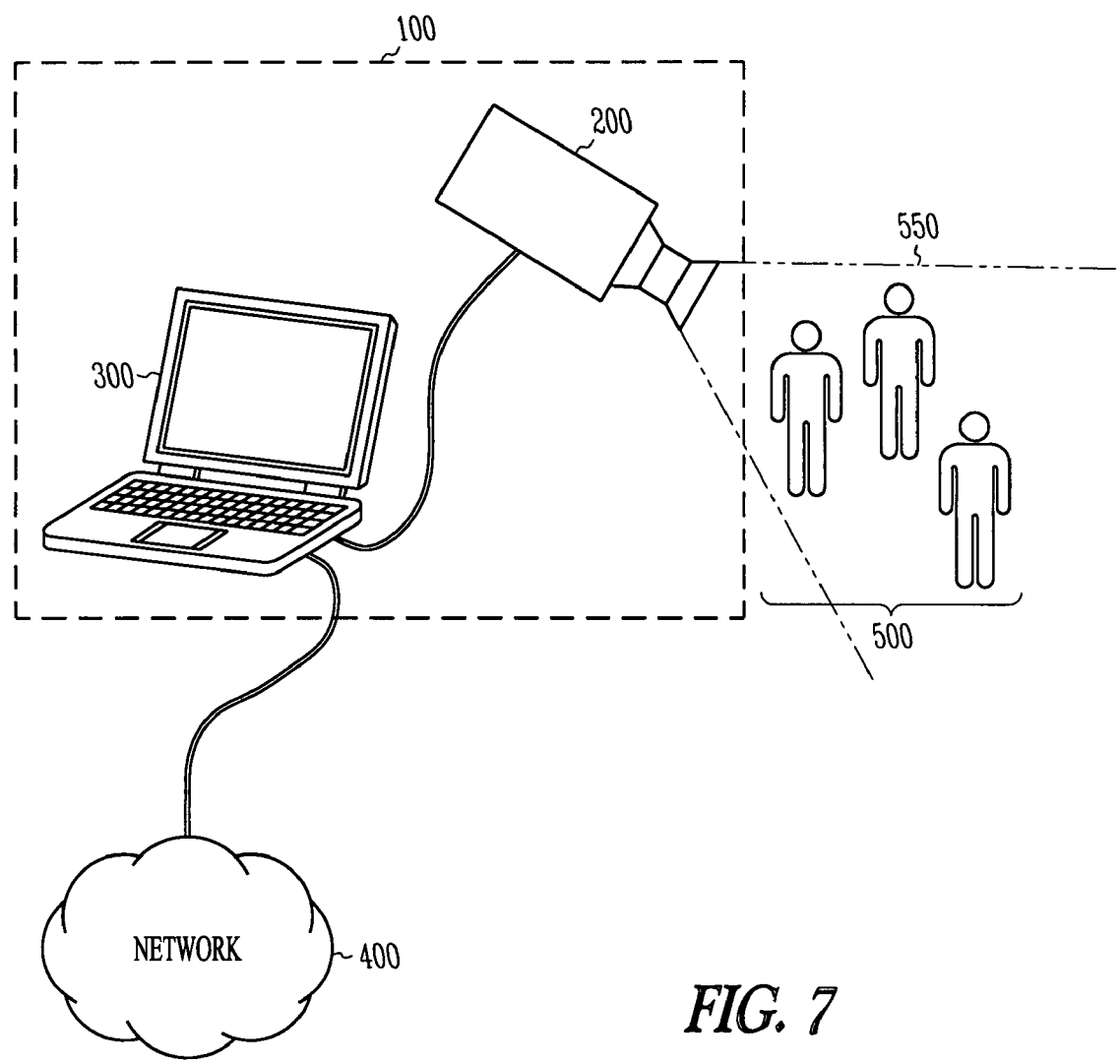
FIG. 7 illustrates a system according to the present subject matter.

An example of the present subject matter can be embodied in a program operable on a computer system as illustrated in FIG. 7. System 100 includes computer 300 coupled to camera 200. Computer 300 is shown coupled to communication network 400. Communication network 400 can be used to communicate data with another system or device at a remote location. The data may include results of the counting or monitoring generated by the present subject matter or it can include operating instructions or commands for controlling the present subject matter.

In the figure, computer 300 is illustrated as a laptop, however, other processors can also be used such as a server or dedicated processor for receiving the image data. The electrical connections shown coupled to computer 300 can be wired or wireless. Computer 300 includes memory (not shown) for storage of instructions or data. The memory can be internal or removable storage (or memory) of various types.

In the figure, camera 200 is positioned to capture image data for a scene. The scene is represented as viewing region 550 in the figure and includes three members arranged in group 500. Camera 200 is calibrated or the data is compensated to correspond to provide calibrated data. In one example, camera 200 includes a still camera or a video camera configured to acquire a series or sequence of images. Calibration data can be stored at camera 200 or at computer 300.

The image data is stored in a memory accessible to computer 300 for later processing or, in one example, the data is processed in real time.

In one example, a user interface allows an operator to enter a parameter or otherwise control the operation of the present subject matter. In the figure, the user interface includes a keyboard. The user interface can also include such elements as a touch-sensitive screen or a mouse device. An output device renders the data in a human perceivable form. Examples of output devices include a display, a printer, a transducer, a memory device, a controller, and a transmitter. In the example illustrated, the present subject matter is coupled to communication network 400 and all or a portion of the processing is conducted at a remote location.

In one example, image data derived from more than one camera is combined and processed to provide count and monitoring information.

SUMMARY

The present subject matter includes a system for counting crowds of people in real-time. The method uses a global description of a group of people and rather than looking for individuals, it uses the area of the entire group as the cue to estimate the number of people.

To improve robustness and stability, an example of the present subject matter uses extensions to a Kalman filter tracker based on the history of estimates. Various methods, such as those based on a heuristic training or based on shape models, can be used for estimating crowd size. Motion trajectories of these crowds can be generated for further data analysis. The system can be configured to count and track people in the presence of occlusions, group merges, and splits. The system is substantially view-point invariant as it uses data from camera calibration methods.

ADDITIONAL EXAMPLES

In one example, the present subject matter determines a count and monitors a crowd based on an intersection of area projected onto two planes spaced apart and in parallel alignment. In one example, the processor receives and input from a user that determines the placement of one or both planes relative to each other. For example, with a crowd of shorter stature, a lower head plane may be selected. In addition, one example provides that more than two planes are considered in determining an area of intersection. For example, one embodiment includes three planes disposed in parallel alignment and an algorithm is executed to select an operative intersecting area for purposes of counting and monitoring. The planes on which the image is projected are sometimes referred to as reference planes.

For counting and tracking, the projection planes are generally disposed in horizontal alignment. Other configurations are also contemplated. For instance, one example includes a camera configured to count and monitor traffic on a hillside or in a stairwell. As such, the projection planes can be positioned to lie generally in parallel with the terrain.

The present subject matter can be operated in an automatic mode in which a processor makes certain selections to generate member count and tracing information. For example, the processor can select automatically filtering parameters and rate data to control the operation of a counting algorithm. In one example, the present subject matter is operated in a manual mode in which the user makes selections for controlling the algorithm. A user interface can be configured in a graphical, textual or other type of framework.

The variable K denotes the area of a person plus a buffer region around the person. In various examples, the area corresponds to that of an ellipse, a circle, or other shape.

In addition to counting and tracking of people, the present subject matter can also be used for counting and tracking animals. For example, livestock can be counted or their movements tracked using the present subject matter. The image is projected onto two planes that are properly positioned and spaced apart to allow distinguishing of a member of the group. In one example, the plane positions are user selectable.

In one example, data derived from regions near the horizon is discarded in calculating count or tracking information. Other methods can also be used to mitigate errors from such data.

The present subject matter can be combined with other methods that extracts data from the image corresponding to the number of heads or to match texture information with various individuals.

CONCLUSION

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising"are open-ended, that is, a system, device, article, or process that includes elements in addition to those listed after such a term in a claim are still deemed to fall within the scope of that claim. Moreover, in the following claims, the terms "first," "second,"and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed:

1. A method comprising:
   calibrating a camera to allow segmentation of three dimensional information from an image received from the camera;
   receiving an image from the camera, the image including a foreground region that contains at least one object of interest;
   segmenting the foreground region;
   projecting the segmented foreground region onto a first reference plane and onto a second reference plane; and
   computing an intersected area using a difference between an area on the first reference plane that corresponds to the at least one object of interest and an area on the second reference plane that corresponds to the at least one object of interest.

2. The method of claim 1 wherein the first reference plane corresponds to a ground plane.

3. The method of claim 1 wherein the second reference plane corresponds to a plane at a predetermined height above the first reference plane.

4. The method of claim 1 wherein the second reference plane corresponds to a height approximately that of a human.

5. The method of claim 1 further including:
   receiving an average area corresponding to an individual; and
   calculating a count using a quotient of the intersected area and the average area.

6. The method of claim 1 further including identifying at least one ellipse corresponding to the intersected area.

7. The method of claim 6 wherein identifying the at least one ellipse includes calculating an eigenvector using the intersected area.

8. The method of claim 6 wherein identifying the at least one ellipse includes minimizing a cost function using the intersected area.

9. The method of claim 6 further including:
   determining an area for an average individual; and
   determining a count using the area for the average individual and the at least one ellipse.

10. The method of claim 9 further including storing the count as a function of time.

11. The method of claim 10 further including, for a predetermined period of time, calculating at least one of a mode, a median and an average.

12. A non-transitory computer-readable medium including instructions executable in a processor for carrying out a method comprising:
    receiving an image having segmentable three dimensional information and a foreground region, the foreground region including a depiction of at least one person;
    segmenting the foreground region from the image;
    generating a shape using an intersected area, the intersected area corresponding to projections of the at least one person in the segmented foreground region onto both a ground plane and an elevated plane, the elevated plane disposed parallel to the ground plane and at a predetermined height relative to the ground plane; and
    determining a count corresponding to the at least one person using a ratio of an area of the generated shape and an area of a modeled person.

13. The medium of claim 12 wherein the predetermined height corresponds to a height approximately that of a human.

14. The medium of claim 12 further including identifying at least one ellipse corresponding to the shape.

15. The medium of claim 14 wherein identifying the at least one ellipse includes calculating an eigenvector using the intersected area.

16. The medium of claim 14 wherein identifying the at least one ellipse includes minimizing a cost function using the intersected area.

17. The medium of claim 12 further including storing the count as a function of time.

18. The medium of claim 17 further including, for a predetermined period of time, calculating at least one of a mode, a median and an average.

19. A system for counting people in a crowd, the system comprising:
    an image capture module for receiving segmentable, three dimensional image data including a foreground, the foreground having a depiction of at least one person;
    a processor for segmenting the foreground, projecting the depiction in the segmented foreground region onto a ground plane and an elevated plane, determining an intersected area based on the projection of the depiction in the segmented foreground onto both the ground plane and the elevated plane, the elevated plane disposed parallel to the ground plane and at a predetermined height relative to the ground plane, and for producing a count corresponding to the depiction, the count based on a ratio of the intersected area and a unit measure, the unit measure corresponding to an area of a person.

20. The system of claim 19 further including an input device coupled to the preprocessor and wherein the input device includes at least one of a keyboard, a mouse, and a removable storage device.

21. The system of claim 19 further including an output device coupled to the processor and wherein the output device includes at least one of a display, a printer, a transducer, a memory device, a controller, and a transmitter.

22. An apparatus for counting members of a group, the apparatus comprising:
    an image receiver for receiving an segmentable, three dimensional image including a foreground, the foreground including a depiction of at least one member;
    a processor for segmenting the foreground, calculating an intersected area using a projection of the depiction of the segmented foreground onto both a ground plane and onto an elevated plane, the elevated plane disposed parallel to the ground plane and at a predetermined height relative to the ground plane, and for determining a count of members in the environment using a ratio of the intersected area and a unit area corresponding to the at least one member.

23. The apparatus of claim 22 wherein the processor is adapted to determine an area of at least one ellipse corresponding to the intersected area.

24. The apparatus of claim 22 wherein the processor executes an algorithm to minimize a cost function.

25. The apparatus of claim 22 further including a tracking register to store the count as a function of time and wherein the image receiver is configured to receive a plurality of environments in time sequence.

26. The apparatus of claim 22 wherein the image receiver includes a camera.

27. The apparatus of claim 22 wherein the processor executes an algorithm to implement a filter.

28. The apparatus of claim 27 wherein the filter includes a non-linear filter.

* * * * *